United States Patent
Di Biase et al.

(10) Patent No.: US 11,624,021 B2
(45) Date of Patent: Apr. 11, 2023

(54) METHOD FOR CONTROLLING THE PERMEABILITY OF A PETROLEUM WELL

(71) Applicant: ENI S.P.A., Rome (IT)

(72) Inventors: Elisa Di Biase, Milan (IT); Matia Minelli, San Donato Milanese (IT); Davide Moscatelli, Arese (IT); Azzurra Agostini, Milan (IT)

(73) Assignee: ENI S.P.A., Rome (IT)

(*) Notice: Subject to any disclaimer, the term of this patent is extended or adjusted under 35 U.S.C. 154(b) by 24 days.

(21) Appl. No.: 16/957,584

(22) PCT Filed: Dec. 28, 2018

(86) PCT No.: PCT/IB2018/060679
§ 371 (c)(1),
(2) Date: Jun. 24, 2020

(87) PCT Pub. No.: WO2019/130253
PCT Pub. Date: Jul. 4, 2019

(65) Prior Publication Data
US 2020/0332173 A1    Oct. 22, 2020

(30) Foreign Application Priority Data
Dec. 29, 2017 (IT) .................. 102017000151257

(51) Int. Cl.
E21B 33/138 (2006.01)
C09K 8/512 (2006.01)
E21B 21/00 (2006.01)

(52) U.S. Cl.
CPC .......... *C09K 8/512* (2013.01); *E21B 21/003* (2013.01); *E21B 33/138* (2013.01)

(58) Field of Classification Search
None
See application file for complete search history.

(56) References Cited

U.S. PATENT DOCUMENTS

| | | | | |
|---|---|---|---|---|
| 3,044,548 A | * | 7/1962 | Perry | ........... C09K 8/5083 166/295 |
| 3,727,691 A | | 4/1973 | Muecke et al. | |

(Continued)

FOREIGN PATENT DOCUMENTS

| | | | |
|---|---|---|---|
| JP | 2002029867 | * | 1/2002 |
| JP | 2007291179 | * | 11/2007 |

(Continued)

OTHER PUBLICATIONS

Li Xiangyang; "Common Knowledge Evidence 1"; Practical Manual for Construction Supervision of Waterproofing Projects; The First Edition, China Electric Power Press; Aug. 2005; pp. 440-441.

(Continued)

*Primary Examiner* — Charles R Nold
(74) *Attorney, Agent, or Firm* — Cantor Colburn LLP

(57) ABSTRACT

A method for controlling the permeability of an oil well includes the steps of
preparing a polymerizable bicomponent system having at least
a fluid with at least an olefinically unsaturated first polymerizable compound; optionally, at least one radical polymerization initiator $I_A$, the initiator $I_A$ being activated thermally or in the presence of an accelerating compound and
a fluid with a radical polymerization activator, the activator being selected from: a radical polymerization initiator $I_B$ for polymerizing the polymerizable compound, the initiator $I_B$ having an activation temperature equal to or lower than the temperature of the thief zone, an accelerator of the initiator $I_A$,
The method further includes injecting one of the fluids into the well annulus until the thief zone is reached, and (Continued)

injecting the remainder into the tubular element, until it comes into contact with the fluid injected through the annulus to form a blocking polymer at the thief zone.

18 Claims, 2 Drawing Sheets

(56) References Cited

U.S. PATENT DOCUMENTS

| | | | | |
|---|---|---|---|---|
| 3,990,381 | A | * | 11/1976 | Shepherd ............ C09D 5/1656 |
| | | | | 427/415 |
| 4,637,467 | A | | 1/1987 | Shaw et al. |
| 2011/0079389 | A1 | | 4/2011 | Mackay et al. |
| 2013/0126160 | A1 | * | 5/2013 | Rule .......................... C08J 3/12 |
| | | | | 507/224 |
| 2016/0215199 | A1 | | 7/2016 | Reddy et al. |

FOREIGN PATENT DOCUMENTS

| KR | 2008061421 | * | 7/2008 |
|---|---|---|---|
| KR | 2010026473 | * | 3/2010 |

OTHER PUBLICATIONS

International Search Report dated Mar. 4, 2019 re: Application No. PCT/IB2018/060679, pp. 1-3.
Written Opinion dated Mar. 4, 2019 re: Application No. PCT/IB2018/060679, pp. 1-7.

* cited by examiner

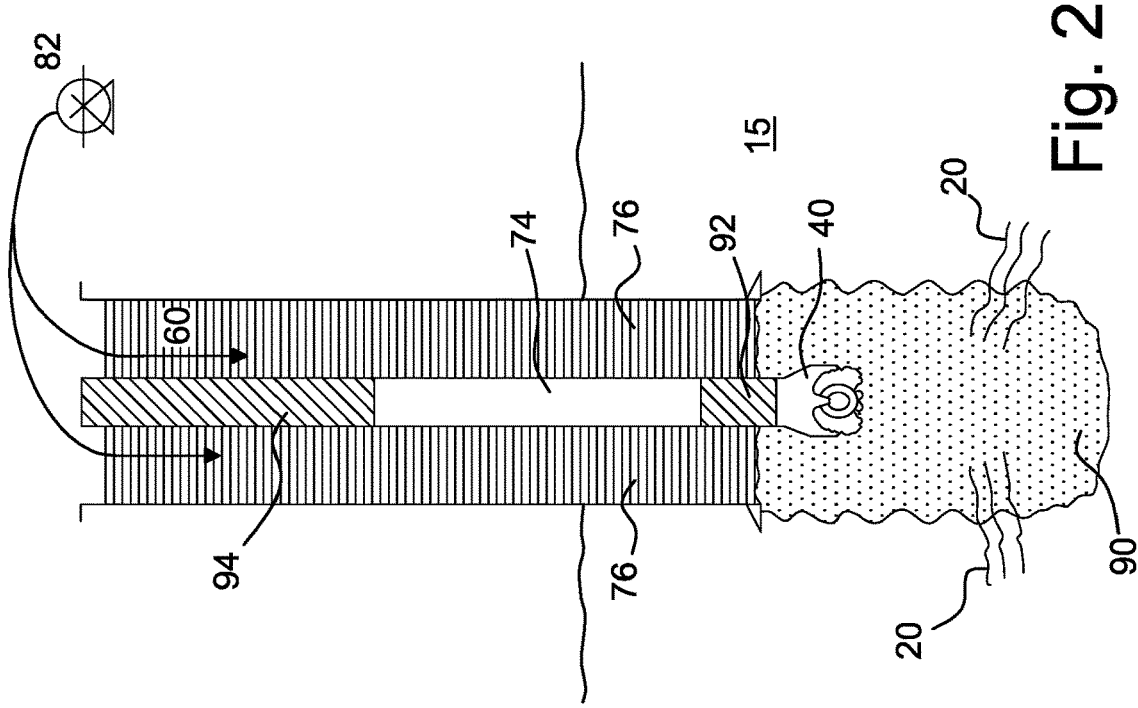
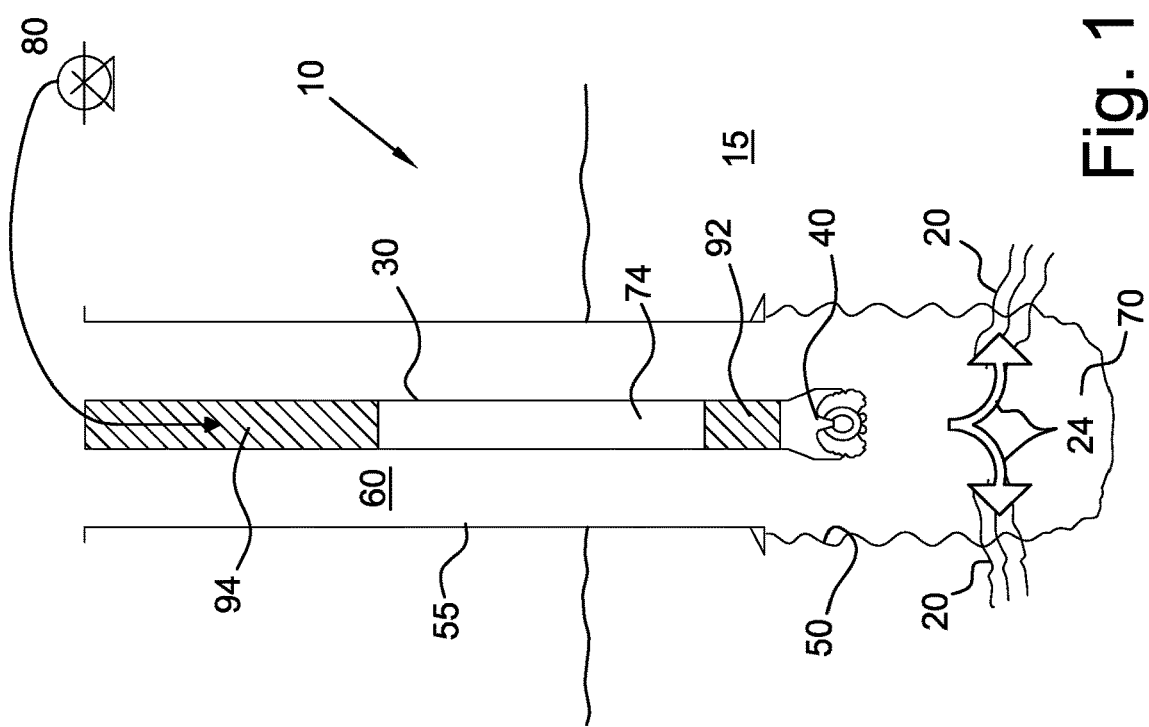

METHOD FOR CONTROLLING THE PERMEABILITY OF A PETROLEUM WELL

TECHNICAL FIELD

The present disclosure relates to a method for controlling the permeability of an oil well. The method according to the present disclosure is particularly useful to recover circulation loss of a drilling fluid during the drilling of an oil well in a rock formation. The method according to the present disclosure can also be used to control the fluid permeability of an oil well also during the production and well abandonment phases, including its possible shut down.

BACKGROUND

The drilling of an oil well with the "rotary" drilling technique is based on the drilling of a rock formation using a tool (drill bit) that is rotated and pushed concurrently on the rock of the well bottom by a drill string. The drill string comprises a tubular element normally consisting of a series of hollow pipes screwed together in sequence, generally made of steel and with circular cross section, suitable for the transmission of the rotary motion and forming in its interior a conduit suitable for the flowing of a fluid. During drilling, the debris generated by the drill bit (cuttings) are brought to the surface by means of a drilling fluid (so-called drilling mud), usually consisting of an aqueous-based or oil-based liquid. The drilling mud is made to circulate from the surface to the bottom of the well through said hollow tubular element. At the well bottom the mud escapes from the tube, which is in fluid communication with the excavation area, and from there it returns to the surface driving the cuttings, passing through the gap formed by the annulus delimited at one side by the tube formed by the series of rods, and at the other side by the wall of the wellbore or, in the more usual case, by the casing of the well. The outflowing mud, after removal of the debris, is injected to the well bottom again. The circulation of the mud then takes place in a closed hydraulic circuit that allows to maintain the wellbore constantly filled.

The drilling mud, in addition to bringing the debris generated by the drill bit back to the surface, performs other functions, such as: cooling and lubricating the drill bit, preventing the entry into the well of undesired layer fluids and temporarily hamper the collapse of the walls of the wells.

When drilling, the drilling mud may flow into the rock formation, causing a loss in the circulation system (called "circulation loss"). Circulation losses are mainly due to the presence of empty spaces (fractures or fissures) in the rock formation or to the high permeability of the rock formation. The zone of a rock formation where a circulation loss occurs is also called "thief zone", and the term will be used with this meaning hereinafter and in the claims. This is normally intercepted during the drilling phase in proximity to the well bottom zone.

The circulation losses that occur during the drilling of a well can create numerous drawbacks. For example sudden circulation loss can cause the undesired entry of layer fluids into the well, the collapse of the hole or the accumulation of debris upstream of the drill string, generating encrustations that can prevent the correct operation or can even cause safety problems to the entire drilling rig. In certain cases, circulation losses can be of such size as to require the interruption of the drilling activity to allow the interventions to restore the circulation system, with consequent negative economic impact on the entire activity.

In the state of the art, the interventions carried out to recover circulation loss are based mainly on the injection into the well of plugging fluids able to change the permeability of the thief zone. The plugging fluids are generally obtained by adding to the drilling mud fibrous materials (e.g. hemp, jute, sawdust), materials in flakes (e.g. mica scales, shavings), granular materials (e.g. ground walnut shells) or in larger pieces, according to the permeability of the rock formation. Once they are injected into the well, these fluids form plugs at the thief zone, which modify the fluid permeability of the formation, restoring the system for the circulation of the drilling muds.

In case of severe circulation losses, alternatively to the aforesaid plugging fluids, it is also possible to use fluids based on cement mortars or polymerizable compounds. Since in these fluids the plugging material is formed as a result of a chemical reaction (the curing reaction of the cement mortar or the polymerization reaction), they are formulated so as to ensure that the aforesaid reaction to form the plugging material starts only when the fluid is positioned at the thief zone and, in particular, when it has completely flowed out of the string of rods used for its injection.

The techniques to remedy circulation losses of the prior art have several drawbacks.

The blocking effect obtained with plugs, for example, in many cases is only temporary. Since the geological nature of the thief zone to be plugged cannot be known with sufficient precision, the plugging material used is often not the one best suited for the purpose.

The plugs obtained with the materials of the prior art, moreover, are not always able to withstand the pressures exerted by the drilling mud, once the well drilling activity resumes.

An additional drawback of the prior art is tied to the fact that the injection of the plugging fluids often requires extracting the drill string from the well, with the consequent lengthening of the times required to carry out the intervention and the increase of the related costs.

In the case of plugging fluids based on cement mortars or polymerizable compounds, moreover, the times for the resumption of the drilling operations are frequently very long (e.g. up to 12 hours). To prevent the curing or the polymerization of the plugging fluid inside the string of rods, which would cause the obstruction of the tubular element formed thereby, thus jeopardizing the safety of the drilling installation, special additives are added to these fluids to delay the start of the curing or polymerization. However, the presence of these additives inevitably lengthens the time needed for the plugging material to be formed in the subsoil. Furthermore, these fluids have the additional drawback of having a limited pot-life, albeit partially extended by the presence of the aforesaid additives. The limited pot-life provides operators with a relatively short time to complete the injection of the plugging fluid into the formation after its preparation.

Additional disadvantages of the plugging techniques of the prior art reside in the difficulty of positioning the plugging fluid with sufficient precision at the thief zone and in the possible contamination of the plugging fluid by the drilling mud present in the well, which can cause its dilution, thus reducing its effectiveness.

Already known in the art is the use of bicomponent polymerizable systems in the operations of exploitation of a petroleum reservoir, but substantially with reference to operations for confining underground areas, particularly to reduce the water coning.

SUMMARY

In consideration of the aforesaid state of the art, the disclosure provides a method for controlling, and in particular reducing or inhibiting, the fluid permeability of a hole of an oil well, that allows to overcome one or more of the drawbacks of the state of the art.

In particular, a purpose of the present disclosure is to provide a method for controlling the permeability of an oil well that is effective and rapidly implemented, so as to allow a fast resumption of the activities of the well (e.g. drilling, completion, production or abandonment).

A second purpose of the present disclosure is to provide a method for controlling the permeability of an oil well that can be implemented in safer conditions for the operators of the installation with respect to prior art methods.

An additional purpose of the present disclosure is to provide a method for controlling the permeability of an oil well that is easy to implement and economically attractive.

The Applicant has found that these and other purposes, that will be better illustrated in the description that follows, can be achieved injecting separately in the oil well the two reactive components of a bicomponent polymerizable system, so that they come in contact and react only once they arrive at the rock formation zone of the hole whose permeability is to be modified (thief zone); contact between the two reactants activates a polymerization reaction with in situ formation of a blocking polymer that serves as a barrier impermeable to fluids, such as drilling fluids.

The aforesaid technical effect can be obtained injecting into the well one of the two reactive components inside the tubular element and the remaining component in the annulus delimited by the wall of the tubular element and by the wall of the well, or possibly, of the casing associated therewith, if present.

The bicomponent system is formed by a first fluid component (fluid A) containing at least one polymerizable compound and by a second fluid component (fluid B) containing at least one polymerization activator to activate the polymerization of the polymerizable compound injected with the first component.

A particularly advantageous aspect of the present disclosure is that the activation of the polymerization reaction is easily controllable. The reaction is triggered only following the contact of both components inside the well. This allows to control the time of the initiation with greater precision, thus reducing the period, oftentimes of uncertain length, necessary for the formation of the blocking polymer in the hole and speeding up the resumption of the operations of the well, avoiding also, in many cases, the need to use polymerization retardants.

The formation of a blocking polymer by in situ polymerization of two reactive components injected separately in the well, through two distinct cavities, also allows to avoid the formation of a plugging material in the string of hollow pipes of the interior tubular element or in the annulus with consequent obstruction of its cavity if, for any reason, the fluid containing the polymerizable monomers remains in said cavities longer than expected. This significantly reduces the risks of accident and damages to the surface and well bottom equipment.

The injection of the two components of the polymerizable system into the well through separate cavities, moreover, allows to position the blocking polymer with precision at a desired point of the rock formation in which the well is drilled.

The method according to the present disclosure, in addition to being able to be applied to control the fluid permeability of a thief zone of an oil well during the drilling operations, can advantageously also be used in the production or well decommissioning phases. Also in these phases, problems involving the loss of the fluids injected into the well may occur due to the presence of thief zones in the rock formation, or it may become necessary to plug the well to be decommissioned to ensure its safety and stability.

The polymerizable bicomponent system usable for the purposes of the present disclosure, moreover, is not substantially affected by pot-life problems, because the two components start forming the blocking polymer only when they mutually come in contact inside the well. Moreover, each of the two reactive components, separately, has relatively high stability. The two components can then be prepared and stocked separately on the surface in a simpler and safer way with respect to the mono-component polymerizable compositions of the prior art.

An additional advantage of the present disclosure is that the polymerizable bicomponent system can be injected into the well, exploiting the string of pipes present therein (e.g. drilling rods), without using a dedicated string of rods, with evident advantages from the economic and installation management point of view.

According to a first aspect, the present disclosure then concerns a method for controlling the permeability of an oil well comprising:

at least one hollow tubular element positioned inside said well in a direction parallel to the longitudinal axis of the same, optionally, at least one tubular casing of the wall of said well, and at least one annulus interposed between said tubular element and the wall of said well or of said optional tubular casing, said oil well also comprising at least one thief zone, said method comprising the following steps:

I) preparing a polymerizable bicomponent system, comprising, at least:

a fluid A comprising:

(a-i) at least one first olefinically unsaturated polymerizable compound;

(a-ii) optionally, at least one radical polymerization initiator $I_A$ for polymerizing said polymerizable compound, said initiator $I_A$ being activated thermally or in the presence of an accelerating compound;

a fluid B comprising a radical polymerization activator, said activator being selected from:

(b-i) a radical polymerization initiator $I_B$ for polymerizing said polymerizable compound, said initiator $I_B$ having an activation temperature equal to or lower than the temperature of said thief zone, (b-ii) an accelerator of said initiator $I_A$;

II) injecting one of said fluid A and said fluid B into said annulus until said thief zone is reached;

III) injecting the remainder between said fluid A and said fluid B into said hollow tubular element until it comes into contact with the fluid injected through said annulus to form a blocking polymer at said thief zone.

According to the present disclosure, said steps (II) and (III) can be carried out, entirely or in part, concurrently with each other, or independently one after the other, or at an appropriate time interval from each other.

For the purposes of the present description and of the attached claims, the verb "to comprise" and the terms deriving therefrom also include the verb "to consist of" and "to consist essentially of", as well as the terms deriving therefrom.

The limits and the numerical intervals expressed in the present description and in the attached claims also include the mentioned numerical value or numerical values. Moreover, all the values or sub-intervals of a limit or numerical interval shall be understood to be specifically included as if they were explicitly mentioned.

The term "oil well", as used herein in the description and in the claims, refers in general to wells for the extraction of both liquid and gaseous hydrocarbon fluids, including natural gas as well. The oil well generally comprises a hole inside an underground or undersea formation containing hydrocarbon fluids, and it can be, at least partly, delimited by the same rock of the formation (wall of the well), or, preferably, by a casing, generally made of steel, able to consolidate the rock wall, possibly with the support of cement material. In certain cases, there may be multiple concentric casings. For the purposes of the present description, the innermost casing is considered.

According to the present disclosure, said at least one thief zone is preferably located in proximity to the well bottom, i.e. in the zone of the well where the tubular element and the annulus are in fluid communication with each other. In this way the blocking polymer is generated in an optimal position to block the circulation loss.

As stated, the bicomponent system is formed by a first fluid A containing at least a polymerizable compound and by a second fluid B containing at least one polymerization activator.

The aforesaid polymerizable compound is a compound containing at least one ethylene unsaturation, preferably at least one primary ethylene unsaturation. Non-limiting classes of polymerizable compounds usable in the fluid A of the present disclosure are acrylates, including methacrylates, cyanoacrylates, acrylonitrile and other substituted acrylates, as well as styrene and substituted styrenes. Acrylic acid and methacrylic acid and the respective esters or salts are preferred. Examples of polymerizable compounds usable for the purposes of the present disclosure are: acrylic acid, methacrylic acid, styrene, divinylbenzene, vinyl acetate, acrylamide, acrylates (e.g. methyl (meth)acrylate, ethyl (meth)acrylate, butyl (meth)acrylate, isobutyl (meth)acrylate, 2 ethyl hexyl methacrylate, tridecyl acrylate, hexyl acrylate, dodecyl acrylate), polyethylene glycol (meth)acrylates, (e.g. polyethylene glycol methacrylate (PegmaOH, number average molecular weight Mn=500), polyethylene glycol methyl terminal methacrylate (PEGMA, Mn=200, 300, 400, 600, 1000, 2000), hydroxyalkyl (meth)acrylates (e.g. 2-hydroxyethyl (meth)acrylate), diacrylates, chloride solutions of [2-(methacryloyloxy)ethyl]trimethylammonium (MADQUAT), mono-2-(methacryloyloxy)ethyl succinate (HemaQ), potassium salt of 3-sulfopropyl methacrylate (SPMAK) and mixtures thereof.

Preferably, the polymerizable compound is selected from ethyl acrylate, butyl acrylate, hexyl acrylate, methyl methacrylate, ethyl methacrylate, hydroxyethyl acrylate, 2-hydroxyethyl methacrylate, polyethylene glycol methacrylate and mixtures thereof.

The polymerizable compound can be a monomer, an oligomer, a prepolymer or a mixture thereof.

The fluid A of the polymerizable system can comprise two or more different polymerizable compounds, so as to obtain the formation of blocking copolymer having the desired properties. As illustrated in more detail below, in some embodiments the polymerizable compound can be present, at least in part, also in the fluid B of the polymerizable bicomponent system.

For the purposes of the present disclosure, the polymerization activator present in the fluid B is an agent able to trigger the polymerization of a polymerizable compound with which it is in contact when determined thermal or reactive conditions, or both, occur.

Depending on the specific composition of the fluid A, the polymerization activator present in the fluid B can be a radical polymerization initiator which can be activated thermally or an accelerating agent.

In a first preferred embodiment of the present disclosure, the fluid A comprises at least one polymerizable compound and the fluid B comprises, as activator, at least one radical polymerization initiator $I_B$ activated thermally to polymerize said polymerizable compound, which has an activation temperature equal to or lower than the temperature of the thief zone whose permeability is to be controlled. In this first embodiment of the disclosure, the activation of the polymerization is triggered by the contact between the first fluid A and the second fluid B at the thief zone, after the respective injections into the well. Since the activation temperature of the initiator $I_B$ is lower than the temperature of the thief zone, at the moment of contact between the two fluids in the vicinity of or inside said zone, the initiator $I_B$ produces free radicals that promote the polymerization reaction of the polymerizable component contained in the fluid A with formation of the blocking polymer.

As is well known, the temperature of an oil well changes as a function of its depth. For example, the temperature of a well, and hence of a thief zone, can vary from 25° C. on the surface to 150° C. at a depth of 3000-5000 m.

Preferably, the initiator $I_B$ has an activation temperature, according to the cases, in the range from 30° C. to 150° C.

For the purposes of the present description and of the attached claims, the activation temperature of an initiator is the temperature at which the initiator has a half-life of 10 hours ($T_{1/2}(10\ h)$) in a determined organic solvent, inorganic solvent or water.

Non-limiting examples of compounds usable as initiator $I_B$ according to this first embodiment of the disclosure are diazo compounds such as:
1) 2,2'-Azobis[2-(2-imidazolin-2-yl)propane]dihydrochloride (VA-044)—$T_{1/2}(10\ h)$=44° C. (solvent=water);
2) 2,2'-Azobis[2-(2-imidazolin-2-yl)propane]disulfate dihydrate (VA-046B)—$T_{1/2}(10\ h)$=47° C. (solvent=water);
3) 2,2'-Azobis(2-methylpropionamidine)dihydrochloride (V50)—$T_{1/2}(10\ h)$=56° C. (solvent=water);
4) 2,2'-Azobis[N-(2-carboxyethyl)-2-methylpropionamidine]tetrahydrate (VA-057)—$T_{1/2}(10\ h)$=57° C. (solvent=water);
5) 2,2'-Azobis{2-[1-(2-hydroxyethyl)-2-imidazolin-2-yl]propane}-dihydrochloride (VA-060)—$T_{1/2}(10\ h)$=60° C. (solvent=water);
6) 2,2'-Azobis[2-(2-imidazolin-2-yl)propane] (VA-061)—$T_{1/2}(10\ h)$=61° C. (solvent=water);
7) 2,2'-Azobis(1-imino-1-pyrrolidin-2-ethylpropane)dihydrochloride (VA-067)—$T_{1/2}(10\ h)$=67° C. (solvent=water);
8) 2,2'-Azobis{2-methyl-N-[1,1-bis(hydroxymethyl)-2-hydroxyethyl]propionamide} (VA080)—$T_{1/2}(10\ h)$=80° C. (solvent=water);
9) 2,2'-Azobis[2-methyl-N-(2-hydroxyethyl)propionamide] (VA086)—$T_{1/2}(10\ h)$=87° C. (solvent=water);

10) 4,4'-Azobis(4-cyanovaleric acid)—$T_{1/2}(10\ h)=50°$ C. (solvent=water);
11) 2,2'-Azobis(2-methylpropionamidine) dihydrochloride granular—$T_{1/2}(10\ h)=55°$ C. (solvent=water);
12) Azobisisobutyronitrile—$T_{1/2}(10\ h)=65°$ C. (solvent=toluene);

peroxides, such as:
13) ammonium persulfate—$T_{1/2}(10\ h)=65°$ C. (solvent=water);
14) sodium persulfate—$T_{1/2}(10\ h)=65°$ C. (solvent=water);
15) potassium persulfate—$T_{1/2}(10\ h)=65°$ C. (solvent=water);
16) hydroxymethanesulfonic acid monosodium salt dihydrate—$T_{1/2}(10\ h)=60°$ C. (solvent=water);
17) Benzoyl peroxide—$T_{1/2}(10\ h)=70°$ C. (solvent=benzene);
18) Tert-butyl peroxide—$T_{1/2}(10\ h)=125°$ C. (solvent=benzene);
19) Cumene hydroperoxide—$T_{1/2}(10\ h)=135°$ C. (solvent=toluene).

According to this first embodiment of the present disclosure, the initiator $I_B$ is added to the fluid B of the polymerizable system in a quantity in the range 0.1%-20% by weight relative to the weight of the polymerizable compound present in the fluid A, more preferably in the range 0.1%-7%, still more preferably from 0.2% to 3% by weight.

For the purposes of the present description and of the attached claims, unless it is explicitly indicated otherwise, when reference is made to the weight of the polymerizable compound it also includes the weight of any cross-linking agent that may be present.

According to this first embodiment of the disclosure, the fluid B generally does not contain polymerizable compounds. However, if desired, the fluid B can also comprise at least a second polymerizable compound, equal to or different from the polymerizable compound contained in the fluid A, preferably in the presence of an inhibitor compound of the initiator in the fluid B, as described below.

In a second preferred embodiment of the present disclosure, the fluid A comprises at least one polymerizable compound and at least one radical polymerization initiator $I_A$ activated thermally or in the presence of an accelerating agent of said initiator.

The initiator $I_A$ can be activated after the injection and positioning of the fluid A in the well, according to one of the following ways: (i) by exposure to a temperature higher than its activation temperature; (ii) by effect of the contact on an accelerating agent contained in the fluid B.

For the purposes of the present description and of the attached claims, an accelerating agent is an agent able to promote the activation of a radical polymerization initiator at a temperature lower than the thermal activation temperature of the initiator.

For the purposes of the present disclosure, when reference is made to a polymerization initiator that can be activated by means of an accelerating agent, at a given temperature $T_1$, it is not excluded that the same initiator may also be activated thermally at a second temperature $T_2$, in particular at a temperature $T_2$ higher than $T_1$.

When the initiator $I_A$ is used in combination with a fluid B containing an accelerating agent, preferably the initiator $I_A$ and the related accelerating agent form a redox initiation system.

Redox initiation systems comprise at least two compounds able to generate free radicals following a reduction-oxidation reaction thereof.

According to this second embodiment, the initiator $I_A$ is a radical polymerization initiator whose activation temperature can be lower than or equal to the temperature of the thief zone or, preferably, an activation temperature higher than the temperature of the thief zone. If the activation temperature of the initiator $I_A$ is lower than or equal to the temperature of the thief zone, said fluid A conveniently comprises an appropriate quantity of an inhibitor compound.

Preferably, the initiator $I_A$ has an activation temperature higher than the temperature of the thief zone.

Preferably, the initiator $I_A$ has activation temperature $T_{1/2}(10\ h)$ in the range 30° C.-150° C. More preferably, the initiator $I_A$ has an activation temperature $T_{1/2}(10\ h)$ higher than 50° C., even more preferably above 80° C.

In general, the compounds usable as initiator $I_A$ according to this second embodiment of the disclosure are the same compounds previously described for use as initiators $I_B$ in the fluid B, provided that the initiator $I_A$ preferably has a higher activation temperature than the temperature of the thief zone.

Preferably, the accelerator $I_B$ of the initiator $I_A$ present in the fluid B is a compound containing elements or groups able to assume more than one oxidation state and hence able to give reduction-oxidation reaction with the initiator $I_A$. More preferably, said accelerator $I_B$ is selected from: aliphatic or aromatic organic amines, preferably having from 2 to 30 carbon atoms and from 1 to 5 nitrogen atoms, ferrous salts, for example halides, sulfates, phosphates, nitrate ion salts, such as ammonium nitrate, potassium nitrate, silver nitrate, nitro derivatives of organic compounds, quinone compounds or combinations thereof.

Examples of accelerators of the initiator $I_A$ usable according to this second embodiment of the disclosure are: para-toluidine; tetramethylenediamine, monoethanolamine, diethanolamine, triethanolamine, ethylenediamine, N,N-dimethylaniline, ferrous sulfate, silver nitrate.

Non-limiting examples of redox initiation systems that are particularly preferred for the purposes of the present disclosure comprise the following combinations (by contact and reaction) of compounds: benzoyl peroxide/para-toluidine; ammonium persulfate/tetramethylenediamine; ferrous sulfate/potassium persulfate; ammonium persulfate/monoethanolamine; ammonium persulfate/diethanolamine; ammonium persulfate/triethanolamine; ammonium persulfate/ethylenediamine; hydrogen peroxide/ferrous sulfate; hydrogen peroxide/silver nitrate; ammonium peroxide/ferrous sulfate; potassium persulfate/ferrous sulfate.

When the initiator $I_A$ has higher activation temperature than the temperature of the thief zone, it can advantageously be mixed with the polymerizable compound homogeneously to form the fluid A of the polymerizable system, without the start of the polymerization reaction. In fact, the polymerization reaction will start only when, inside the well, the accelerator contained in the fluid B of the polymerizable system will come in contact with the fluid A containing the initiator. Since the polymerization reaction is exothermic, the reaction heat developed diffuses towards the remaining mass of the fluid A containing the mix of polymerizable compound-initiator $I_A$, thermally activating additional molecules of the initiator $I_A$, which, generating free radicals, promote the polymerization of the remaining polymerizable compound. The propagation of a polymerization reaction initiated thermally in a point of a reaction mixture to adjacent regions to said point by diffusion of the reaction heat developed is also known in the art as "frontal polymerization".

In the context of the present disclosure, use of a redox initiator system to perform a frontal polymerization of the type described above offers the significant advantage of overcoming any difficulties in mixing the polymerizable compound and the initiator that could occur inside the well, when said polymerizable compound and said initiator are injected separately, in different fluids of the polymerizable bicomponent system.

When the fluid A contains at least a first polymerizable compound and an initiator $I_A$ having an activation temperature lower than or equal to the temperature of said thief zone, said fluid A further comprises at least one polymerization inhibitor for inhibiting the polymerization of said first polymerizable compound.

For the purposes of the present disclosure, a polymerization inhibitor is an agent able to stabilize the polymerizable compound present in the fluid B, preventing its premature polymerization. In general, polymerization inhibitors are compounds that act capturing the free radicals present in the reaction environment, preventing the start of the polymerization. Examples of compounds usable as polymerization inhibitors for the purposes of the present disclosure are: hydroquinone, methoxyphenol, acetanilide.

According to this second embodiment, preferably the initiator $I_A$ is added to the fluid A of the polymerizable system in a quantity in the range 0.1%-10% by weight with respect to the weight of the polymerizable compound, more preferably in the range 1.1%-6%.

The inhibitor is dosed in such a quantity that the polymerization inhibition effect lasts at least until the fluid A comes in contact with the fluid B that contains the accelerating agent inside the well.

Preferably, the inhibitor is added to the fluid A of the polymerizable system in a quantity in the range 0.1%-8% by weight relative to the weight of the polymerizable compound, more preferably in the range 1.5%-4%.

According to a third preferred embodiment of the method according to the present disclosure, the mechanism of frontal polymerization can advantageously be exploited using a polymerizable bicomponent system in which the first fluid (fluid A) comprises at least one polymerizable compound mixed with a first polymerization initiator which can be activated thermally in situ after injection and the second fluid (fluid B) comprises at least a second polymerization initiator $I_B$ to polymerize said polymerizable compound, the aforesaid initiator $I_B$ having activation temperature equal to or lower than the temperature of the thief zone.

According to this third embodiment, following the contact between the fluid A and the fluid B inside the well, the initiator $I_B$ initiates the polymerization reaction. By effect of the diffusion of the reaction heat progressively developed, the polymerization reaction propagates from the contact point between the two fluids to the remaining mass of the fluid A. The presence of the first initiator distributed uniformly in the fluid A promotes a more rapid and homogeneous formation of the blocking polymer.

In all the embodiments of the present disclosure, regulating the concentration ratio between the polymerization initiator and the polymerizable compound in the bicomponent system it is possible to change the rate of formation of the blocking polymer.

The first and the second component of the polymerizable system are normally in liquid form at ambient temperature and can thus be easily injected into the well. The liquid form can be due to the liquid nature of the ingredients of the two components of the polymerizable system, for example of the polymerizable compound and of the initiator, or it can be obtained dissolving or dispersing the ingredients of the fluids A and B in a solvent.

Preferably, the fluid A and the fluid B of the polymerizable system are in the form of solutions.

Since the fluid A and the fluid B of the polymerizable system are injected in a well that is generally filled or partially filled with drilling muds, preferably said fluids are substantially immiscible with the mud.

The immiscibility of a fluid of the polymerizable system with respect to a drilling mud can be controlled, for example, adding water to the fluid, in the case of an oil-based mud, or adding hydrocarbon solvents in the case of a water-based mud. Examples of usable hydrocarbon solvents are the mixes available commercially with the trademark Lamix® (mix of $C_{11}$-$C_{14}$ hydrocarbons containing n-alkanes, isoalkanes and cyclic hydrocarbons, aromatic hydrocarbon content lower than 2% by weight) and Versalis E-solv G® (mix of aliphatic and aromatic hydrocarbon solvents).

Preferably, the water and the hydrocarbon solvents are added to a fluid in a quantity up to 50% by weight relative to the polymerizable compound, more preferably in the range 10%-30%.

The use of the fluids A and B of the polymerizable system in diluted form following the addition of water or hydrocarbon solvents also offers the advantage of allowing a better dissipation of the heat that develops during the polymerization reaction, avoiding excessively violent developments of heat, which could occur for example if pure polymerizable compounds are used.

Optionally, the polymerizable system can also contain at least one cross-linking agent to form a cross-linked blocking polymer or copolymer.

Examples of cross-linking agents which can be used for the purposes of the present disclosure are: ethylene glycol dimethacrylate, 1,4-butanediol diacrylate, glycerol dimethacrylate, N,N'-methylene-bis-acrylamide, divinylbenzene, poly(ethylene glycol) diacrylate, trimethyl-propane triacrylate, 1,4-bis(4-vinylphenoxy)butane, bis(2-methacryloyl) oxyethyl disulfide.

The degree of cross-linking of the blocking polymer can be varied, adjusting the concentration of cross-linking agent in the polymerizable system. Generally, increasing the relative concentration of cross-linking agent relative to the concentration of the polymerizable compound, more rigid polymers with higher mechanical strength are obtained.

Preferably, the cross-linking agent is added to the component that comprises the polymerizable compound, in a quantity in the range 10%-50% by weight relative to the weight of the polymerizable compound (including said cross-linking agent), more preferably in the range 15%-30% by weight.

Optionally, one or both of the components of the polymerizable system can contain at least one viscosifying agent to control the rheological characteristics of the component. Examples of viscosifying agents usable for the purposes of the present disclosure are: methylcellulose, ethylcellulose, synthetic oils (e.g. Lucant®), carboxymethylcellulose, glycerin, xanthan gum, starch, lipophilic bentonites.

Preferably, the viscosifying agent is added to a component in a total quantity up to 50% by weight relative to the weight of the polymerizable compound, more preferably in the range 0.1%-15% by weight.

The viscosifying agent can be present in one or both of the components of the polymerizable system.

Optionally, one or both of the components of the polymerizable system can contain at least one weighting material to control the rheological characteristics of the component. Examples of weighting material usable for the purposes of the present disclosure are: barite (barium sulfate), siderite, hematite, galena or soluble salts (e.g. chlorides of alkali or alkaline earth metals).

Preferably, the weighting material is added to a component in a total quantity up to 100% by weight relative to the weight of the polymerizable compound, more preferably in the range 5%-60% by weight.

The components of the polymerizable system can also contain additional additives, such as for example the additives used in the preparation of the drilling muds, for example fluidifiers, emulsifiers, defoamers, etc.

The components of the polymerizable system can be prepared in accordance with the techniques and the devices generally used for the preparation of drilling muds.

According to the present disclosure, the fluid A and the fluid B of the polymerizable system can be injected into the well, indifferently, through the hollow tubular element or through the annulus.

Preferably, the fluid A containing the polymerizable compound is injected in the annulus while the fluid B containing the activator is injected in the hollow tubular element.

The ratio between the quantities of the fluid A and of the fluid B injected varies mainly according to the composition of the individual fluids and to the position of the thief zone of the well to be impermeabilized. Generally, the volume ratio between the quantity of fluid A and the quantity of fluid B injected is in the range from 1 to 40, preferably in the range from 3 to 20.

To facilitate the injection of the fluids A and B of the polymerizable system and their positioning inside the well, a displacement fluid can be used, for example a drilling mud, which is injected after the respective fluids A and B. Preferably, the displacement fluid and the fluid to be displaced are substantially immiscible with each other.

In another embodiment of the present disclosure, the method can also be used to modify the permeability of a well in the shut-down and/or abandonment phase. In this case, for example, the formation of the blocking polymer can be directed in the desired zone using the production tube as tubular element for the transport of the fluid B and the annulus with the casing of the well for the transport of the fluid A.

BRIEF DESCRIPTION OF THE DRAWINGS

A possible embodiment of the present disclosure is described below with reference to the accompanying FIGS. 1-4. Each of FIGS. 1-4 schematically illustrate an oil well in four successive instants of implementation of the method according to the present disclosure:

FIG. 1 illustrates a circulation loss during the drilling of a well according to an exemplary embodiment;

FIG. 2 illustrates fluid being injected into the well according to an exemplary embodiment;

DETAILED DESCRIPTION OF THE DRAWINGS

Figure 4:
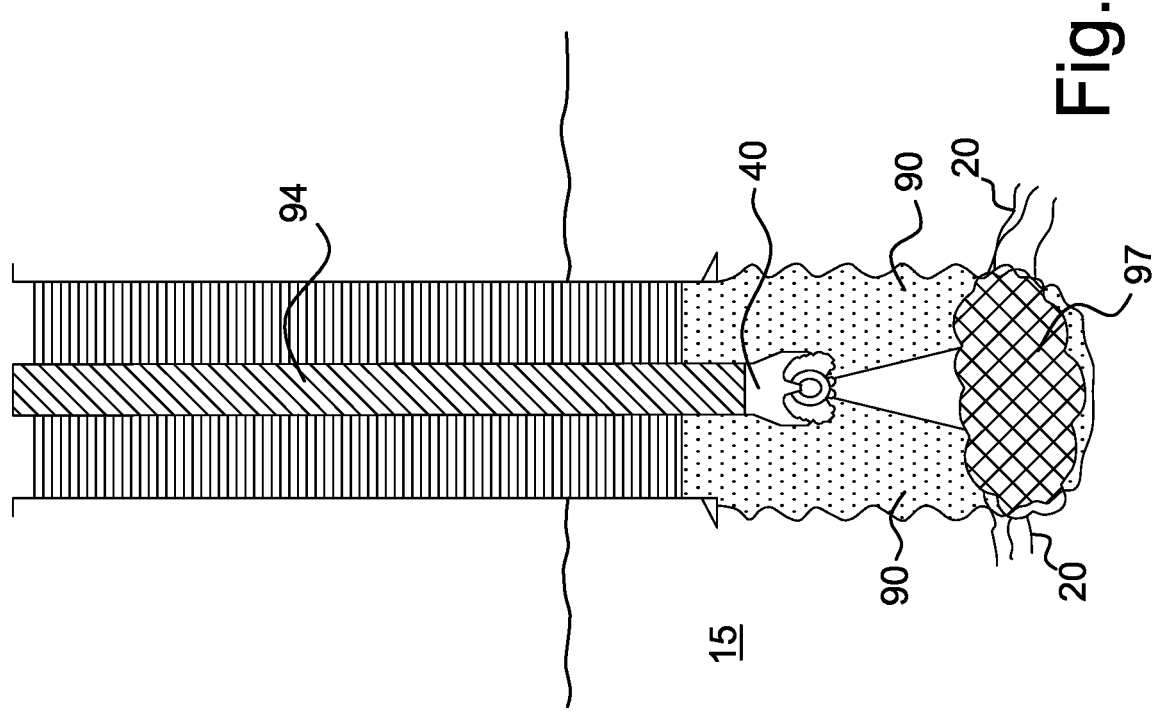
FIG. 4 illustrates a polymerization reaction as a result of the contact between the fluids.

With reference to FIG. 1, the method according to the present disclosure is applied to remedy a circulation loss during the drilling of a well 10 in a rock formation 15 caused by the presence of a thief zone 20 in proximity to the bottom 70 of the well 10. The well 10 comprises a hole 50, partially cased by a casing 55, and a tubular element comprises a battery of hollow rods 30 (drill string) at the lower end of which a drill bit 40 is connected. The outer surface of the drill string 30 and the wall of the hole 50 and of the casing 55 delimit an annulus 60 that is in hydraulic communication with the inner cavity of the drill string 30.

If the drilling of the hole is carried out using a water-based mud, a polymerizable bicomponent system can be used wherein:

a fluid A 90 comprises a mix formed, for example, by: a polymerizable acrylate monomer (e.g. butyl acrylate), a cross-linking agent (e.g. ethylene glycol dimethacrylate), a radical initiator (e.g. benzoyl peroxide, which is soluble in the acrylate monomer);

a fluid B 74 comprises, for example, a dimethylaniline (accelerator) dissolved in a hydrocarbon solvent.

The fluid A and the fluid A are prepared and stored separately in two distinct tanks positioned on the surface (not shown in the figures) and connected to respective injection pumps.

For the injection of the fluid B 74, the drill string 30 is connected to a pump 80 connected to the storage tank of said fluid.

By means of the pump 80, the fluid B 74 is injected in the drill string 30, which is full of mud, until reaching in proximity to the drill bit 40, but without flowing out of the lower end of the tube formed by the rods. During injection, the fluid B 74 displaces the mud 92 present inside the rods, which escapes towards the bottom of the well flowing mainly towards the thief zone 20 according to the direction indicated by the arrows 24.

Advantageously, the fluid B 74 it pushed towards the bottom of the drill string 30 by means of a displacement fluid 94, immiscible with the fluid B 74. The displacement fluid 94 can be, for example, the same drilling mud used for drilling the well or another fluid having lower density than that of the fluid B 74. The displacement of the fluid B 74 is achieved in such a way as to leave a certain quantity of drilling mud 92 inside the drill string 30 so as to form a plug (for example, with height equal to 20 m) that prevents the fluid B 74 from escaping from the drill string 30.

The fluid A 90 is injected into the annulus 60 of the well 10 by means of a pump 82 (FIG. 2) connected to the tank for the preparation and storage of said fluid A (not shown in the figures). By effect of the injection of the fluid A, the mud present in the annulus 60 is pushed towards the thief zone 20, where it disperses in the rock formation 15, leaving space to the fluid A 90 in the annulus 60 (FIG. 2).

The quantity of fluid A 90 injected is a function of the dimensions of the thief zone 22 to be blocked. After the injection, the fluid A 90 is further pushed towards the thief zone 22 using a displacement fluid 76.

Figure 3:
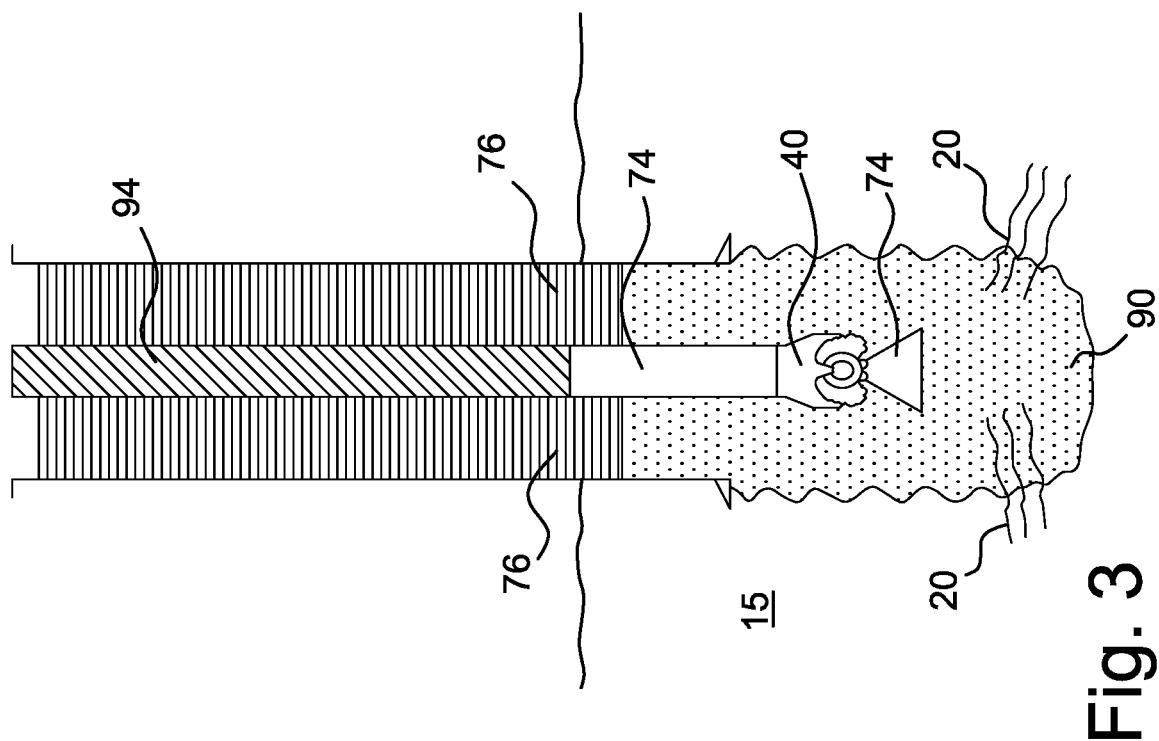
FIG. 3 illustrates fluid being positioned and additional displacement fluid being injected according to an exemplary embodiment.

With reference to FIG. 3, once the fluid A 90 is positioned, in the drill string 30 is injected additional displacement fluid 94 until causing the fluid B 74 to escape from the drill string. The fluid B 74 thus comes in contact with the fluid A 90 starting the polymerization reaction. After displacing all of the fluid B 74 from the interior of the drill string 30, the latter is preferably raised to a safe level not involved in the formation of the blocking polymer.

With reference to FIG. 4, once the polymerization reaction starts as a result of the contact between the fluids A and B, it continuous in the remaining mass of the fluid A 90 by effect of the diffusion of the reaction heat (frontal polymerization), leading to the formation of a blocking polymer 97 at the thief zone 20, which is then made impermeable to drilling mud.

At the end of the formation of the blocking polymer 97, the well drilling activity can resume, proceeding first of all with drilling of the excess of blocking polymer 97 which may be present in the hole.

The following examples are provided to further illustrate the present disclosure and should not be construed in a sense that would limit the scope of protection defined by the enclosed claims.

EXAMPLE 1

Preparation of a Polymerizable Bicomponent System Suitable for Use in Combination with a Water-Based Mud The first component of the polymerizable system (fluid A) was prepared using 20 g of a mix of monomers containing butyl acrylate (BA) and methyl methacrylate (MMA) in a BA/MMA weight ratio of 20/80. To the mix of monomers were added 30% by weight of ethylene glycol dimethacrylate (EGDMA) (cross-linking agent) and 1.4% by weight of benzoyl peroxide (BPO) (radical initiator, half-life temperature of 70° C., using benzene as a solvent), the aforesaid weight percentages being referred to the weight of the mix of BA and MMA monomers.

The viscosity of the fluid A was then adjusted adding 9% by weight of ethylcellulose (EC) and 50% by weight of barium sulfate (percentages referred to the weight of the mix of BA and MMA monomers of the fluid A).

The second component of the polymerizable system (fluid B) was prepared mixing 1/1 by volume the commercial hydrocarbon solvent Lamix® with 1.4 g of dimethylaniline (DMA) (equal to 7% by weight of the weight of the mix of monomers BA and MMA used in the preparation of the fluid A).

The viscosity of the fluid B was then adjusted adding 0.7% by weight of ethylcellulose (EC) and 50% by weight of barium sulfate (percentages referred to the weight of the mix of BA and MMA monomers of the fluid A).

The first component and the second component were found to be immiscible in a water-based mud with density of 1.44 kg/L having the following composition:
Water: 825 L/m3
Viscosifier: 3 kg/m3
Filtrate reducer: 6 kg/m3
Barite: 625 kg/m3
Sodium hydroxide: 1.5 kg/m3
Sodium carbonate: 1.5 kg/m3
Sodium or Potassium Chloride (optional): 285/m3.

The fluids A and B, in the aforesaid quantities, were mixed and made to react introducing the fluid B in the fluid A. The mix of the two fluids was then conditioned in a stove at 60° C., observing after a few minutes the formation of a solid polymeric material.

The fluids A and B were also conditioned separately at 60° C. to prove their stability over prolonged times. The fluids were found to be stable at the aforesaid temperature for at least 24 hours.

EXAMPLE 2

Polymerization of a Bicomponent System Suitable for Use in Combination with a Water-Based Mud in Frontal Polymerization Mode A bicomponent system was prepared with the same procedures and the same reactants in the same proportions used in the previous example 1 for the preparation of the fluids A and B respectively. 50 gr of mix of BA and MMA, 20/80 by weight, were used.

20 ml of the fluid A thus prepared were transferred to a glass vial with diameter of 15 mm and length of approximately 300 mm. Maintaining the vial inclined by approximately 45°, approximately 3 ml of fluid B were poured along the inner wall, letting it slowly flow towards the surface of the fluid A. The two fluids were not mixed except for a thickness of approximately 5 mm in the zone of mutual contact. The remaining fluid B formed a layer of approximately 2 cm above the fluid A.

After approximately half a minute, browning was observed at the interface of the two fluids, while the wall of the vial became warm to the touch. The browning and the temperature increase were rapidly propagated towards the bottom of the vial. After approximately 3 minutes the fluid A was completely polymerized, as it was possible to ascertain after breaking the vial.

The ability of the bicomponent system according to the present disclosure to block the permeability of an underground loss is thus evident, triggering polymerization in a relatively distant point from the thief zone, after introducing the fluid A in the porosities of the zone. In this way it is possible to modify the permeability of a thief zone in an oil well, until it is completely blocked for a sufficient segment to assure its seal, with not need to use potentially unstable and uncontrollable systems like mono-component systems.

EXAMPLE 3

In a vial with length of 300 mm and diameter of 15 mm, similar to the one used in the previous example 2, $CaCO_3$ in granules was introduced (mean particle size 500 µm) for a height of approximately 100 mm. In the vial held inclined by 45° was then slowly introduced the fluid A prepared as described above, until complete imbibition, thus obtaining a layer of approximately 100 mm of impregnated calcium carbonate similar to a layer of porous rock into which fluid A was introduced according to stage (II) of the process according to the present disclosure.

Similarly to the example 2, approximately 1 ml of fluid B prepared as in the example 2 was then made to flow, which formed a layer with a height of approximately 1 cm above the mixed phase of saturated carbonate of fluid A. The walls became warm to the touch, indicating the start and the propagation of the frontal polymerization. The coloration of the mixed phase turned pale yellow. After approximately 10 minutes, the vial was cooled and its glass wall was fractured. The material contained was found to be completely solidified retaining all carbonate.

EXAMPLE 4

Preparation of a Polymerizable Bicomponent System Suitable for Use in Combination with an Oil-Based Mud The first component (fluid A) of the polymerizable system was prepared using a mix of monomers containing 2-hydroxyethyl methacrylate (HEMA) and hydroxyethyl acrylate (HEA) in a weight ratio HEMA/HEA of 75:25. To 20 g of the mix of monomers were added 20% by weight (2 g) of ethylene glycol dimethacrylate (EGDMA) (cross-linking agent), 7% by weight of hydrogen peroxide and 35% by weight of water, the aforesaid percentages by weight being referred to the weight of the mix of HEMA/HEA monomers of the fluid A.

The viscosity of the fluid A was adjusted adding 4.5% by weight of methylcellulose (MC) and 68% by weight of barium sulfate (percentages referred to the weight of the mix of HEMA and HEA monomers of the fluid A).

The second component of the polymerizable system (Fluid B) was prepared dissolving in water 0.48 g of ferrous sulfate (FeO) (2.4% by weight relative to the weight of the mix of HEMA and HEA monomers in the fluid A), until reaching an iron sulfate concentration equal to 7.2% by weight relative to the weight of the solution.

The fluid A and the fluid B were found to be immiscible in an oil-based mud with density of 1.30 kg/L having the following composition:
Base oil: 650 L/m3
Water: 170 L/m3
Calcium Chloride: 42 kg/m3
Primary emulsifier: 22 L/m3
Wetting Agent: 10 L/m3
Organophilic clay: 20 kg/m3
Calcium hydroxide: 22 kg/m3
Barite: 495 kg/m3.

The fluids A and B, in the aforesaid quantities, were mixed and made to react at 60° C. as described in the example 1, observing, in this case too, the formation of a solid polymeric material after a few minutes.

The fluids A and B were also conditioned separately at 60° C. and found to be stable at the aforesaid temperature for at least 24 hours.

It is finally understood that the disclosure described and illustrated herein can be made additional modifications and variants without thereby departing from the scope of protection as defined by the attached claims.

The invention claimed is:

1. A method for controlling the permeability of an oil well, comprising:
at least one hollow tubular element positioned inside said well in a direction parallel to the longitudinal axis of the same,
optionally, at least one tubular casing of the wall of said well, and
at least one annulus between said tubular element and the wall of said well or of said optional tubular casing,
said oil well also comprising at least one thief zone,
said method comprising the following steps:
I) preparing a polymerizable bicomponent system, comprising, at least:
a fluid A comprising:
(a-i) at least one first olefinically unsaturated polymerizable compound;
(a-ii) optionally, at least one radical polymerization initiator $I_A$ for polymerizing said polymerizable compound, said initiator $I_A$ being activated thermally or in the presence of an accelerating compound;
a fluid B comprising a radical polymerization activator, said activator being selected from:
(b-i) a radical polymerization initiator $I_B$ for polymerizing said polymerizable compound, said initiator $I_B$ having an activation temperature equal to or lower than the temperature of said thief zone, or, alternatively,
(b-ii) an accelerator of said initiator $I_A$;
II) injecting one of said fluid A and said fluid B into said annulus until said thief zone is reached;
III) injecting the remainder between said fluid A and said fluid B into said hollow tubular element until it comes into contact with the fluid injected through said annulus to form a blocking polymer at said thief zone.

2. The method according to claim 1, wherein said fluid A comprises said at least one radical polymerization initiator $I_A$ and said fluid B comprises said at least one accelerating compound of said initiator $I_A$.

3. The method according to claim 1, wherein said fluid A comprises said at least one radical polymerization initiator $I_A$ and said fluid B comprises at least one radical polymerization initiator $I_B$ for polymerizing said polymerizable compound, said initiator Is having an activation temperature equal to or lower than the temperature of said thief zone.

4. The method according to claim 2, wherein said at least one radical polymerization initiator $I_A$ has an activation temperature equal to or higher than the temperature of said thief zone.

5. The method according to claim 2, wherein said at least one radical polymerization initiator $I_A$ has an activation temperature lower than or equal to the temperature of said thief zone and said fluid A comprises at least one polymerization inhibitor for inhibiting the polymerization of said first polymerizable compound.

6. The method according to claim 1, wherein said fluid A comprises said at least one olefinically unsaturated polymerizable compound and said fluid B comprises said at least one radical polymerization initiator $I_B$ having an activation temperature equal to or lower than the temperature of said thief zone.

7. The method according to any of the previous claim 1, wherein said fluid B is injected into said hollow tubular element and said fluid A is injected into said annulus.

8. The method according to claim 1, wherein said fluid A is injected into said hollow tubular element and said fluid B is injected into said annulus.

9. The method according to claim 1, wherein said olefinically unsaturated polymerizable compound is selected from: acrylic acid, methacrylic acid, styrene, divinylbenzene, vinyl acetate, acrylamide, acrylates, methacrylates, polyethylene glycol (meth)acrylates, polyethylene glycol methyl terminal methacrylate, hydroxyalkyl (meth)acrylates, diacrylates, chloride solutions of [2 (methacryloyloxy)ethyl] trimethylammonium (MADQUAT), mono-2-(methacryloyloxy)ethyl succinate (HemaQ), potassium salt of 3-sulfopropyl methacrylate (SPMAK) and mixtures thereof.

10. The method according to claim 9, wherein said olefinically unsaturated polymerizable compound is selected from: ethyl acrylate, butyl acrylate, hexyl acrylate, methyl methacrylate, ethyl methacrylate, hydroxyethyl acrylate, 2-hydroxyethyl methacrylate, polyethylene glycol methacrylate and mixtures thereof.

11. The method according to claim 1, wherein said initiator $I_A$ and said polymerization initiator $I_B$ are selected from:
2,2'-Azobis[2-(2-imidazolin-2-yl)propane]dihydrochloride;
2,2'-Azobis[2-(2-imidazolin-2-yl)propane]disulfate dihydrate;
2,2'-Azobis(2-methylpropionamidine)dihydrochloride;
2,2'-Azobis[N-(2-carboxyethyl)-2-methylpropion-amidine] tetrahydrate;
2,2'-Azobis{2-[1-(2-hydroxyethyl)-2-imidazolin-2-yl]propane}-dihydrochloride;
2,2'-Azobis[2-(2-imidazolin-2-yl)propane];
2,2'-Azobis(1-imino-1-pyrrolidine-2-ethylpropane)dihydrochloride;
2,2'-Azobis{2-methyl-N-[1,1-bis(hydroxymethyl)-2-hydroxyethyl]propionamide};
2,2'-Azobis[2-methyl-N-(2-hydroxyethyl)propionamide];

ammonium persulfate;
sodium persulfate;
potassium persulfate;
Hydroxymethanesulfonic acid monosodium salt dihydrate;
4,4'-Azobis(4-cyanovaleric acid);
2,2'-Azobis(2-methylpropionamidine) dihydrochloride;
azobisisobutyronitrile;
benzoyl peroxide;
tert-butyl peroxide;
cumene hydroperoxide.

12. The method according to claim 1, wherein said accelerating compound $I_B$ of said initiator $I_A$ is selected from: amines, nitrate ion salts, ferrous salts, organic nitro-derivatives, quinone compounds or combinations thereof.

13. The method according to claim 12, wherein said accelerating compound is selected from: para-toluidine; tetramethylenediamine, potassium persulfate, monoethanolamine, diethanolamine, triethanolamine, ethylenediamine, ferrous sulfate, silver nitrate.

14. The method according to claim 1, wherein said fluid A comprises at least one cross-linking agent to form a cross-linked blocking polymer.

15. The method according to claim 1, wherein the injection of said fluid A and/or said fluid B is followed by the injection of a displacement fluid.

16. The method according to claim 15, wherein said fluid A and/or said fluid B is substantially immiscible with said displacement fluid.

17. The method according to claim 1, wherein said hollow tubular element in said well is composed of a string of hollow pipes connected in series.

18. The method according to claim 1, wherein said hollow tubular element is in hydraulic communication with said annulus, preferably in the proximity of said thief zone.

* * * * *